Sept. 27, 1966   H. F. HARTZELL, JR   3,275,126
SAFETY DEVICE FOR SUSPENDED CONVEYOR TAKE-UP MECHANISMS
Filed Feb. 17, 1965
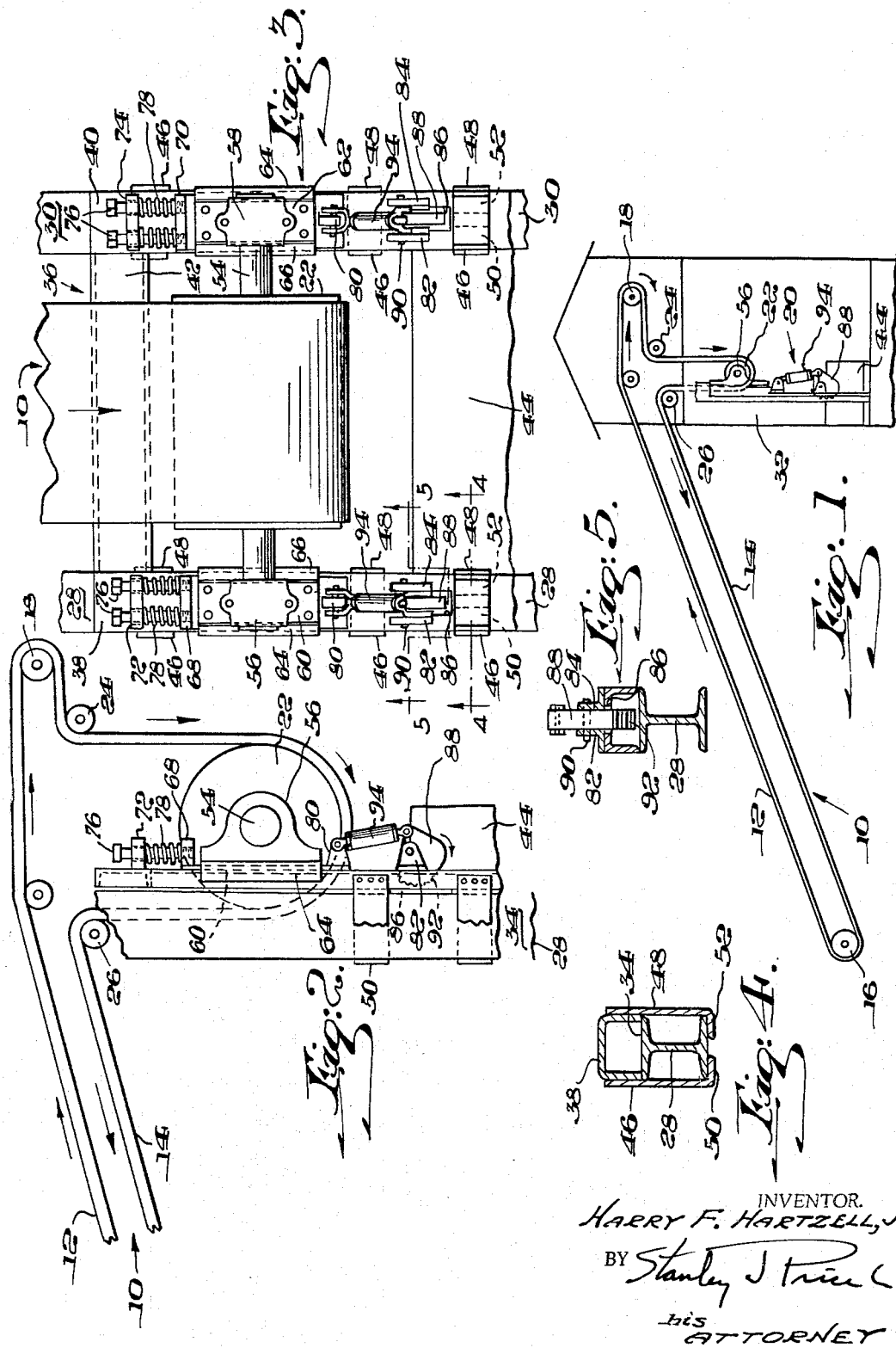
INVENTOR.
HARRY F. HARTZELL, JR.
BY Stanley J. Price
his ATTORNEY

United States Patent Office 3,275,126
Patented Sept. 27, 1966

3,275,126
SAFETY DEVICE FOR SUSPENDED CONVEYOR
TAKE-UP MECHANISMS
Harry F. Hartzell, Jr., Allison Park, Pa., assignor to Koppers Company, Inc., a corporation of Delaware
Filed Feb. 17, 1965, Ser. No. 433,306
5 Claims. (Cl. 198—208)

This invention relates to a take-up mechanism for an endless flexible conveyor belt and more particularly to a safety device for engaging the take-up mechanism to a guide member.

Endless conveyor belts are frequently maintained in tension between the head pulley and tail pulley by means of a weighted take-up mechanism. The return reach of the conveyor belt is reeved around an idler pulley carried by a frame, and the frame is suspended by means of the endless conveyor belt. The take-up mechanism, by its weight, maintains a tension on the endless conveyor belt, and the conveyor belt in turn supports the take-up mechanism. The frame is associated with fixed vertical guide members that permit the take-up mechanism to move vertically along a predetermined path.

In the past, conventional take-up mechanisms were supported in an elevated position by the endless conveyor belt reeved around the idler pulley. The take-up mechanism as a separate structure was freely movable in a vertical direction relative to the fixed guide member and was not secured thereto. A parting of the endless conveyor belt released the weighted take-up mechanism and the take-up mechanism was free to fall, and thereby created a safety hazard. Because of the weight of the take-up mechanism and the required vertical travel, it was impractical to design structures or bumpers at the lower end of their travel to absorb the energy of a free falling take-up mechanism.

The herein described invention is a safety device associated with a suspended conveyor take-up mechanism that arrests the fall of the weighted take-up mechanism by engaging the weighted frame to the fixed guide member upon the release of conveyor belt tension caused by a failure or parting in the endless conveyor belt. The securing means prevents the weighted take-up mechanism from obtaining free fall energy and eliminates the necessity of structures for absorbing this energy.

Briefly, the invention includes a frame member that is positioned in overlying relation with a guide member. An idler roller or idler pulley is supported by the frame member and support means are provided for the idler pulley that are movable longitudinally relative to the frame member. An engaging means is provided for engaging the frame member to the guide member upon release of the support provided by the endless flexible belt reeved around the idler roller.

Accordingly, a principal feature of this invention is to provide a safety device for a suspended conveyor take-up mechanism that engages the take-up mechanism to a fixed guide member when the take-up roller is not exerting a tension force on an endless conveyor belt reeved therearound.

Another feature of this invention is to provide a conveyor take-up mechanism that includes apparatus for moving the idler pulley in a given direction relative to the support frame structure to engage the support frame structure to a fixed guide member upon release of the support of the idler roller by the endless conveyor belt.

In the drawings:

FIGURE 1 is a semischematic view in side elevation of an endless belt conveyor mechanism having the improved suspended take-up mechanism associated therewith.

FIGURE 2 is an enlarged view in side elevation of the take-up mechanism illustrated in FIGURE 1.

FIGURE 3 is a plan view of the take-up mechanism illustrated in FIGURE 2.

FIGURE 4 is a view in section taken along the lines 4—4 of FIGURE 3 and illustrating the manner in which the counterweight frame is movably connected to the fixed guide members.

FIGURE 5 is a view in section taken along the line 5—5 of FIGURE 3 illustrating the manner in which the locking cam engages the fixed guide member.

Referring to the drawings and particularly to FIGURE 1, an endless conveyor belt generally designated by the numeral 10 has a conveying reach 12 and a return reach 14. The endless conveyor belt 10 is reeved around a tail pulley 16 and a head pulley 18. Suitable drive means (not shown) propels the endless conveyor belt 10 in the direction indicated by the arrows so that material may be conveyed thereon from the tail pulley 16 to a suitable discharge location adjacent the head pulley 18. The tail and head pulleys 16 and 18 are arranged at different elevations in FIGURE 1. It should be understood, however, that the herein described invention is also applicable to endless conveyor belts arranged with the head and tail pulleys at substantially the same elevation. Between the tail pulley 16 and head pulley 18 there are a plurality of idler rollers (not shown) that support the conveying reach 12 and the material conveyed thereon. Suitable return idlers (not shown) support the return reach 14 between the head pulley 18 and the tail pulley 16.

In order to maintain desired tension on the endless conveyor belt 10 a take-up mechanism generally designated by the numeral 20 is employed. The take-up mechanism 20 has an idler roller or pulley 22 about which the return reach 14 is reeved so that the endless conveyor belt 10 supports the take-up mechanism 20 in an elevated position. The idler rollers 24 and 26 guide the return reach 14 around the idler roller 22.

The take-up mechanism 20 is guided for vertical movement by a pair of guide members 28 and 30 which are fixedly secured to a superstructure designated by the numeral 32. In order to provide the desired tension on the endless conveyor belt 10, the fixed guide members are elevated so that the weight of the take-up mechanism slidably positioned on the guide members 28 and 30 provides the desired tension for the endless conveyor belt 10.

The guide members 28 and 30 may be fixedly secured to the superstructure 32 in any desired manner and may be fabricated of metal, wood or the like. For illustrative purposes the guide members 28 are illustrated as metal beams that have an upper planar surface 34.

The take-up mechanism 20 is slidably positioned on the guide members 28 and 30 and includes a frame member generally designated by the numeral 36 (FIGURE 3) that has a pair of parallel side channel portions 38 and 40. The channel portion 38 is illustrated in detail in FIGURE 4 wherein the depending flange portions of channel 38 are positioned in overlying relation with the upper planar surface 34 of the guide member 28. The side members 38 and 40 are connected to each other by an upper transverse channel member 42 and a counterweight box 44. The counterweight box 44 contains suitable weights to provide the desired tension on the conveyor belt 10. The side members 38 and 40 have a plurality of depending strap members 46 and 48 that have inturned flange portions 50 and 52 respectively extending inwardly toward each other around the lower portion of the respective guide members 28 and 30 (FIGURE 4). With this arrangement the frame 36 is guided for linear movement in a vertical direction on the guide members 28 and 30.

The idler roller 22 has a fixed shaft 54 extending therethrough with its end portions secured in pillow block bearing members 56 and 58 for rotation therein. The pillow block bearings 56 and 58 are secured to plates 60 and 62 that are slidingly positioned on the respective frame side members 38 and 40. Flange type guide members 64 and 66 are secured to the frame side members 38 and 40 and provide a guide means for the plates 60 and 62 so that the plates 60 and 62 with the pillow blocks 56 and 58 secured thereto are movable linearly on the upper surfaces of the frame side members 38 and 40. The plate members 60 and 62 have upper abutment members 68 and 70 that have a pair of bores therethrough. The frame side members 38 and 40 have a pair of vertical abutment members 72 and 74 with bores therethrough that are axially alined with the bores in the abutment members 68 and 70. Bolt members 76 extend through the bores in the abutment members 72 and 74 and are threadedly secured in the bores in abutment members 68 and 70. Spring members 78 are positioned around the bolts 76 and are compressed by movement of the idler roller 22 upwardly relative to the frame member 36. Thus, with this arrangement, the endless conveyor belt return reach 14 supports or suspends the take-up mechanism 20 in an elevated position. The weights within counterweight box 44 exert a downward force on the take-up mechanism 20 to provide the desired tension on the endless conveyor belt 10. Since the take-up frame 36 is movable relative to the take-up roller 22 by means of the plates 60 and 62 movably secured to the frame side members 38 and 40, the weights within the box 44 also urge the counterweight frame downwardly relative to the idler roller 22 to compress the springs 78 between the respective pairs of abutment members 68-72 and 70-74. The compressive force exerted on the springs 78 is such that upon parting or separation of the endless conveyor belt 10 the springs 78 expand and move the idler roller 22 with its associated plates 60 and 62 downwardly relative to the frame 36 before the frame 36 falls freely on the guide members 28 and 30.

The plate members 60 and 62 each has an upwardly extending lug 80 with a transverse bore therethrough. The frame side members have pairs of upwardly extending spaced lugs 82 and 84 adjacent to the lug 80 on the respective plates 60 and 62 and a longitudinal slotted portion 86 therein between the respective lugs 82 and 84 (FIGURE 5). A cam 88 is rotably secured between the lugs 82 and 84 by means of a pin 90 extending through the aligned bores. The cam 88 extends downwardly through the slotted portion 86 in the respective frame side member and has a serrated lower edge portion 92. An actuating link 94 connects the cam 88 with the upwardly extending lug 80 on the respective plate 60 and 62 by means of pin members extending through aligned bores in clevis portions of the actuating link 94 and receiving bores in the lug 80 and the cam 88. Thus, the cam members 88 are actuated or rotated in the supporting lugs 82 and 84 upon movement of the support plates 60 and 62 relative to the frame side members 38 and 40.

When the idler roller 22 and the associated plates 60 and 62 move downwardly relative to the frame 36 the cams 88 move in the direction indicated by the arrow in FIGURE 2 and the lower serrated portions 92 of cam 88 engage the upper planar surface 34 of the respective guide members 28 and 30. The actuating link 94 includes a suitable adjusting mechanism to control the length of the link member and provide the desired degree of engagement between the cam serrated portion 92 and the planar surface 34 of guide members 28 and 30 so that the frame member 36 is engaged to or secured to the guide members 28 and 30 when the idler roller 22 is not supported by the endless conveyor 10.

The take-up mechanism 20 operates in the following manner. The return reach of the endless conveyor belt 10 is reeved around the pulley 22 and supports the pulley 22 in an elevated position. The weight of the frame 36 urges the frame downwardly and compresses the springs 78 to move the frame 36 downwardly relative to the idler roller 22 and the associated plates 60 and 62, as viewed in FIGURE 3. The actuating links 94 connected to the respective plates 60 and 62 move the cams 88 in a direction opposite to the arrow in FIGURE 2 so that the cam serrated portions 92 are spaced from the guide member planar surfaces 34. In this position the counterweight frame is free to move vertically on the guide members 28 and 30 to provide the desired tension on the endless conveyor belt 10 under different operating conditions. The flexible conveyor belt 10 is spliced at different locations to form an endless loop and the transverse splices are subject to failure and parting. Any parting of the endless conveyor belt 10 would immediately remove the supporting or suspending forces provided for the idler roller 22 and the weighted take-up mechanism 20. If the endless conveyor belt 10 suddenly parts and the suspending or supporting force for idler roller 22 is removed, the expansive force of springs 78 moves the supporting plate 60 and 62 relative to the frame side members 38 and 40 before the take-up mechanism begins its free fall. The relative movement of the support plates 60 and 62 through the actuating links 94 rotates the cam mechanism 88 in the direction indicated by the arrow in FIGURE 2 until the cam mechanism serrated edges 92 engage the planar surface 34 to prevent further downward movement of the frame 36 on the guide members 28 and 30. The cam members 88, forming a portion of the frame 36, wedges the frame 36 to the guide members 28 and 30. Thus a safety device is thereby provided to prevent the take-up mechanism 20 from falling freely from its elevated position and eliminates the hazard previously present in elevated take-up mechanisms.

According to the provisions of the patent statutes, the principle, preferred construction, and mode of operation of the invention have been explained, and what is now considered to represent its best embodiment has been illustrated and described. However, it should be understood that within the scope of the appended claims the invention may be practiced otherwise than as specifically illustrated or described.

I claim:

1. A take-up mechanism for an endless flexible conveyor belt comprising
   a vertically movable counterweight frame having a pair of speed side members,
   a fixed guide member operable to guide said counterweight frame in a vertical direction,
   an idler roller having shaft end portions positioned in overlying relation with said frame side members,
   support members for said shaft end portions, said support members connected to said frame side members and movable linearly relative thereto,
   resilient means urging said support members in a first direction relative to said frame side members, said support members arranged to oppose said urging means by the tension of an endless flexible conveyor belt reeved around said idler roller, and
   means to engage said counterweight frame to said fixed guide member upon movement of said support members in a downward direction relative to said support frame by said resilient means urging said support members in a first direction upon release of tension in said endless flexible conveyor belt reeved around said indler roller.

2. A take-up mechanism for an endless flexible conveyor belt as set forth in claim 1 in which said urging means includes resilient spring members urging said support members in a first direction,
   the tensioned endless flexible conveyor belt arranged to support and suspend the counterweight frame in an elevated position and compress said resilient spring members so that, upon release of the support of said counterweight frame by said endless flexible conveyor belt, said springs expand and move said support members relative to said counterweight frame to thereby actuate said means and engage said counterweight frame to said guide member.

3. A take-up mechanism for an endless flexible conveyor belt as set forth in claim 1 in which said means to engage said counterweight frame to said guide member includes a cam mechanism secured to said counterweight frame and connected to said support member, said cam mechanism arranged upon movement of said support member relative to said counterweight frame in a given direction to engage said counterweight frame to said fixed guide member and thereby arrest downward movement of said counterweight frame.

4. A take-up mechanism for an endless flexible conveyor belt comprising a vertically movable counterweight frame having a pair of spaced side members,
a pair of fixed guide members positioned beneath said counterweight frame spaced side members and operable to guide said counterweight frame in a vertical direction,
an idler roller having shaft end portions positioned in overlying relation with said frame side members,
support members for said shaft end portions, said support members connected to said frame side members and movable linearly relative thereto,
said frame side members having abutment means thereon in spaced relation to said support members, said support members having abutment means thereon arranged in spaced relation to said abutment means on said counterweight frame side members,
resilient springs positioned between said abutment means on said counterweight frame side members and said support members, said resilient springs operable upon compression to urge said support members in a given linear direction away from said abutment means on said side members.
an endless flexible conveyor belt reeved around said idler pulley, the weight of said counterweight frame maintaining said endless flexible belt in tension and said tensioned endless flexible conveyor belt suspending said counterweight frame in an elevated position and compressing said resilient spring members between said respective abutment means,
cam members rotatably secured to said frame side members,
actuating links connected at one end to said respective support members and at the other end to said cam members,
said cam members arranged to be spaced from said respective fixed guide member upon compression of said resilient springs, and
said cam members arranged upon movement of said support member relative to said counterweight frame member under the expansive force of said resilient springs to move said cam members into engagement with said fixed guide member and thereby arrest downward movement of said counterweight frame member.

5. A take-up mechanism for an endless conveyor belt comprising a vertical movable counterweight frame having a pair of spaced side members,
a pair of fixed guide members positioned beneath said counterweight frame spaced side members,
means connecting said counterweight frame to said fixed guide members for vertical movement of said counterweight frame,
an idler roller having a fixed shaft with end portions positioned in overlying relation to said frame side members,
bearing members positioned on said shaft end portions,
said bearing members secured in support members connected to said frame member and movable longitudinally relative thereto,
said frame side members having abutment means thereon in spaced relation to said support members, said support members having abutment means thereon arranged in spaced relation to said abutment means on said counterweight frame side members,
resilient springs positioned between said abutment means on said counterweight frame side members and said support members, said resilient springs operable upon compression to urge said support members in a given linear direction away from said abutment means on said side members,
an endless flexible conveyor belt reeved around said idler pulley, the weight of said counterweight frame maintaining said endless flexible belt in tension and said tensioned endless flexible conveyor belt suspending said counterweight frame in an elevated position and compressing said resilient spring members between said respective abutment means,
said frame members having elongated slotted openings,
cam members rotatably secured to said frame side members and having portions extending through said slotted openings in said frame side members,
actuating links connected at one end to said respective support members and at the other end to said cam members,
said cam members arranged to extend through said slotted portions in said frame side members and in spaced relation with said respective fixed guide member upon compression of said resilient springs,
said cam members arranged upon movement of said support member relative to said counterweight frame member under the expansive force of said resilient springs to move said cam members into engagement with said fixed guide member and thereby arrest downward movement of said counterweight frame member, and
means to adjust the length of said cam members and thereby adjust the distance said support member moves relative to said counterweight frame for said cam members to engage said fixed guide member.

References Cited by the Examiner

UNITED STATES PATENTS 2,633,977   4/1953   McMillan _____ 198—208

EVON C. BLUNK, *Primary Examiner.*

EDWARD A. SROKA, *Examiner.*